United States Patent
Zhao et al.

(10) Patent No.: US 12,095,374 B2
(45) Date of Patent: Sep. 17, 2024

(54) SYSTEM FOR CONTROLLING SKIP MODE OF SWITCHING POWER SUPPLY, AND PWM CONTROLLER

(71) Applicant: BCD SHANGHAI MICRO-ELECTRONICS COMPANY LIMITED, Shanghai (CN)

(72) Inventors: Andong Zhao, Shanghai (CN); Bo Chen, Shanghai (CN); Guanghui He, Shanghai (CN); Cong Zou, Shanghai (CN); Sen Dou, Shanghai (CN); Zheng Ying, Shanghai (CN); Yizhong Xie, Shanghai (CN)

(73) Assignee: BCD SHANGHAI MICRO-ELECTRONICS COMPANY LIMITED, Shanghai (CN)

( * ) Notice: Subject to any disclaimer, the term of this patent is extended or adjusted under 35 U.S.C. 154(b) by 0 days.

(21) Appl. No.: 18/263,338

(22) PCT Filed: Aug. 30, 2022

(86) PCT No.: PCT/CN2022/115750
§ 371 (c)(1),
(2) Date: Jul. 27, 2023

(87) PCT Pub. No.: WO2023/231201
PCT Pub. Date: Dec. 7, 2023

(65) Prior Publication Data
US 2024/0275289 A1    Aug. 15, 2024

(30) Foreign Application Priority Data

May 30, 2022 (CN) .......................... 202210599641.8
May 30, 2022 (CN) .......................... 202221320062.7

(51) Int. Cl.
*H02M 3/335* (2006.01)
*H02M 1/08* (2006.01)

(52) U.S. Cl.
CPC ............ *H02M 3/335* (2013.01); *H02M 1/08* (2013.01)

(58) Field of Classification Search
CPC ............................... H02M 3/335; H02M 1/08
See application file for complete search history.

(56) References Cited

U.S. PATENT DOCUMENTS 9,766,584 B1    9/2017 Ogishima
9,787,203 B2 *  10/2017 Hou .................. H02M 3/33584
(Continued)

FOREIGN PATENT DOCUMENTS

CN    101976959 A    2/2011
CN    103066853 A    4/2013
(Continued)

OTHER PUBLICATIONS

Chang-Hua Lin et al., "Design of a Burst Dimming Controller with Primary-Side Control for EFL Electronic Ballast", 2015 IEEE International Telecommunications Energy Conference (INTELEC), total 4 pages, Sep. 22, 2016.
(Continued)

*Primary Examiner* — Kyle J Moody
(74) *Attorney, Agent, or Firm* — Kilpatrick Townsend & Stockton LLP

(57) ABSTRACT

A system for controlling a skip mode of a switching power supply and a PWM controller are provided. The system includes a feedback signal detection circuit configured to detect an output voltage of the switching power supply and generate a feedback signal related to the output voltage; a primary winding sampling circuit coupled with a primary winding of the switching power supply and configured to
(Continued)

sample a sampling voltage of the primary winding; a skip mode soft control circuit configured to receive the feedback signal and output an electrical signal; and a comparison circuit configured to determine a threshold for the sampling voltage, where the skip mode is activated when the feedback signal is greater than a soft activation voltage threshold, and the skip mode is pre-exited when the feedback signal is less than a predetermined voltage threshold and greater than a soft exit voltage threshold.

17 Claims, 16 Drawing Sheets

(56) References Cited

U.S. PATENT DOCUMENTS

| | | | |
|---|---|---|---|
| 10,312,816 B1 | 6/2019 | Zhao et al. | |
| 10,396,673 B1 * | 8/2019 | Presti | H02M 1/38 |
| 2013/0229829 A1 | 9/2013 | Zhang et al. | |
| 2014/0177290 A1 | 6/2014 | Zhang et al. | |
| 2018/0054111 A1 | 2/2018 | Moon et al. | |
| 2019/0115841 A1 | 4/2019 | Maruyama | |

FOREIGN PATENT DOCUMENTS

| | | |
|---|---|---|
| CN | 206628984 U | 11/2017 |
| CN | 107769567 A | 3/2018 |
| CN | 207200580 U | 4/2018 |
| CN | 108521115 A | 9/2018 |
| CN | 109687398 A | 4/2019 |
| CN | 114884370 A | 8/2022 |
| JP | 2014217145 A | 11/2014 |
| TW | M457343 U | 7/2013 |

OTHER PUBLICATIONS

ISA State Intellectual Property Office of the People's Republic of China, International Search Report Issued in Application No. PCT/CN2022/115750, Jan. 20, 2023 WIPO, 10 pages.
Taiwan Patent Office, 1st Office Action Issued in Application No. 112110118, Sep. 4, 2023, 12 pages.

* cited by examiner

SYSTEM FOR CONTROLLING SKIP MODE OF SWITCHING POWER SUPPLY, AND PWM CONTROLLER

The present application is the national phase of International Patent Application No. PCT/CN2022/115750, titled "SYSTEM FOR CONTROLLING SKIP MODE OF SWITCHING POWER SUPPLY, AND PWM CONTROLLER", filed on Aug. 30, 2022, which claims priorities to Chinese Patent Application No. 202210599641.8, titled "SYSTEM FOR CONTROLLING SKIP MODE OF SWITCHING POWER SUPPLY, AND PWM CONTROLLER" and Chinese Patent Application No. 202221320062.7, titled "SYSTEM FOR CONTROLLING SKIP MODE OF SWITCHING POWER SUPPLY, AND PWM CONTROLLER", filed on May 30, 2022 with the China National Intellectual Property Administration, all of which are incorporated herein by reference in there entireties.

FIELD

The present disclosure relates to the field of power supply, and in particular to a system for controlling a skip mode of a switching power supply, and a PWM controller.

BACKGROUND

A system having a Flyback architecture operates in a constant mode under light load conditions, and the operation frequency is greater than 20 kHz, thus no audio noise is generated and large power loss is generated. The power loss is caused by switching loss. In order to reduce power loss and achieve good efficiency, the switching frequency should be less than 20 kHz. However, in a case of a switching frequency less than 20 kHz, an audio noise is to be generated. Therefore, the system usually operates in a skip mode to eliminate the audio noise. However, when the system enters or exits the skip mode, a peak current of a primary winding jumps significantly, resulting in an audio noise. Therefore, how to eliminate the audio noise generated when the system enters or exits the skip mode is a problem to be solved urgently.

SUMMARY

A system for controlling a skip mode of a switching power supply is provided according to the present disclosure to eliminate an audio noise when entering or exiting the skip mode. A PWM controller is further provided according to the present disclosure, which also has the above effects.

In some embodiments, a system for controlling a skip mode of a switching power supply is provided according to the present disclosure. The system includes a feedback signal detection circuit, a primary winding sampling circuit, a skip mode soft control circuit and a comparison circuit. The feedback signal detection circuit is configured to detect an output voltage of the switching power supply and generate a feedback signal related to the output voltage. The primary winding sampling circuit is coupled with a primary winding of the switching power supply, and is configured to obtain a sampling voltage of the primary winding. The skip mode soft control circuit is configured to receive the feedback signal and output an electrical signal. The comparison circuit is configured to determine a threshold for the sampling voltage based on the electrical signal and the sampling voltage. The skip mode is activated when the feedback signal is greater than a soft activation voltage threshold, and the skip mode is pre-exited when the feedback signal is less than a predetermined voltage threshold and greater than a soft exit voltage threshold.

In an embodiment, the skip mode soft control circuit includes a first comparator, a second comparator, a third comparator, a controller, and a multiplexer. The first comparator is configured to compare the feedback signal with the soft activation voltage threshold. The second comparator is configured to compare the feedback signal with the predetermined voltage threshold. The third comparator is configured to compare the feedback signal with the soft exit voltage threshold. The controller is configured to: when the feedback signal is greater than the soft activation voltage threshold, control the multiplexer to output a first predetermined number of electrical signals, where the comparison circuit outputs the first predetermined number of thresholds and the first predetermined number of thresholds increase successively; and when the feedback signal is less than the predetermined voltage threshold and greater than the soft exit voltage threshold, control the multiplexer to output a second predetermined number of electrical signals, where the comparison circuit outputs the second predetermined number of thresholds and the second predetermined number of thresholds decrease successively.

In an embodiment, when the feedback signal is less than the soft activation voltage threshold and greater than the predetermined voltage threshold, the threshold for the sampling voltage changes with the feedback signal.

In an embodiment, when the feedback signal is less than the soft exit voltage threshold, the threshold for the sampling voltage changes with the feedback signal.

In an embodiment, a voltage signal outputted by the skip mode soft control circuit is inputted to a first terminal of the comparison circuit, and the sampling voltage is inputted to a second terminal of the comparison circuit.

In an embodiment, the feedback signal is inputted to a first terminal of the comparison circuit, and a superposition of a voltage signal outputted by the skip mode soft control circuit and the sampling voltage is inputted to a second terminal of the comparison circuit.

In an embodiment, a superposition of a voltage signal outputted by the skip mode soft control circuit and the feedback signal is inputted to a first terminal of the comparison circuit, and the sampling voltage is inputted to a second terminal of the comparison circuit.

In an embodiment, a voltage signal, converted from a current signal outputted by the skip mode soft control circuit, is inputted to a first terminal of the comparison circuit, and the sampling voltage is inputted to a second terminal of the comparison circuit.

In an embodiment, the feedback signal is inputted to a first terminal of the comparison circuit, and a superposition of a voltage signal converted from a current signal outputted by the skip mode soft control circuit and the sampling voltage is inputted to a second terminal of the comparison circuit.

In an embodiment, a superposition of a voltage signal converted from a current signal outputted by the skip mode soft control circuit and the feedback signal is inputted to a first terminal of the comparison circuit, and the sampling voltage is inputted to a second terminal of the comparison circuit.

In an embodiment, the comparison circuit includes a fourth comparator. A positive input terminal of the fourth comparator serves as a first terminal of the comparison circuit, a negative input terminal of the fourth comparator serves as a second terminal of the comparison circuit, and an output terminal of the fourth comparator serves as an output terminal of the comparison circuit.

In an embodiment, a signal terminal of the multiplexer is connected to an output terminal of the feedback signal detection circuit, and the multiplexer outputs the feedback signal when the feedback signal is less than the soft activation voltage threshold and greater than the predetermined voltage threshold.

In an embodiment, a signal terminal of the multiplexer is not connected to an output terminal of the feedback signal detection circuit, and the multiplexer continuously outputs a voltage equal to zero when the feedback signal is less than the soft activation voltage threshold and greater than the predetermined voltage threshold.

In an embodiment, the system further includes a first low-frequency signal generator. The first low-frequency signal generator is configured to output a low-frequency signal to be superimposed with a signal outputted by the feedback signal detection circuit.

In an embodiment, the system further includes a second low-frequency signal generator. The second low-frequency signal generator is configured to output a low-frequency signal to be superimposed with a signal inputted to the feedback signal detection circuit.

In an embodiment, the system further includes a third low-frequency signal generator. The third low-frequency signal generator is configured to output a low-frequency signal to be superimposed with a signal outputted by the primary winding sampling circuit.

In order to solve the above solutions, a PWM controller is further provided according to the present disclosure. The PWM controller includes the system for controlling a skip mode of a switching power supply described above.

The system for controlling a skip mode of a switching power supply according to the present disclosure includes a feedback signal detection circuit, a primary winding sampling circuit, a skip mode soft control circuit and a comparison circuit. The feedback signal detection circuit is configured to detect an output voltage of the switching power supply and generate a feedback signal related to the output voltage. The primary winding sampling circuit is coupled with a primary winding of the switching mode power supply, and is configured to obtain a sampling voltage of the primary winding. The skip mode soft control circuit is configured to receive the feedback signal and output an electrical signal. The comparison circuit is configured to determine a threshold for the sampling voltage based on the electrical signal and the sampling voltage. The skip mode is activated when the feedback signal is greater than a soft activation voltage threshold, and the skip mode is pre-exited when the feedback signal is less than a predetermined voltage threshold and greater than a soft exit voltage threshold.

It can be seen that with the system for controlling a skip mode of a switching power supply according to the present disclosure, by using the skip mode soft control circuit and the comparison circuit and based on the feedback signal related to the output voltage of the switching power supply and the sampling voltage of the primary winding, the skip mode is activated when the feedback signal is greater than the soft activation voltage threshold, and the skip mode is pre-exited when the feedback signal is less than the predetermined voltage threshold and greater than the soft exit voltage threshold. After the skip mode is activated, the peak current of the primary winding increases gradually, avoiding the audio noise caused by large jumps in the peak current of the primary winding. After the skip mode is pre-exited, the peak current of the primary winding gradually decreases before exiting the skip mode, avoiding the audio noise caused by the large jumps in the peak current of the primary winding when exiting the skip mode.

The PWM controller according to the present disclosure also has the above effects.

BRIEF DESCRIPTION OF THE DRAWINGS

In order to more clearly describe the embodiments of the present disclosure, drawings to be used in the description of the embodiments of the present disclosure or in the conventional technology are briefly described hereinafter. It is apparent that the drawings described below are merely used for describing the embodiments of the present disclosure.

DETAILED DESCRIPTION OF EMBODIMENTS

A system for controlling a skip mode of a switching power supply is provided according to the present disclosure to eliminate an audio noise generated when entering or exiting the skip mode. A PWM controller is further provided according to the present disclosure, and the PWM controller also has the above effects.

The embodiments of the present disclosure are made more clearer, the embodiments of the present disclosure are described clearly and completely below in conjunction with the drawings of the embodiments of the present disclosure. Apparently, the embodiments described below are only some embodiments rather than all the embodiments of the present disclosure.

Figure 1:
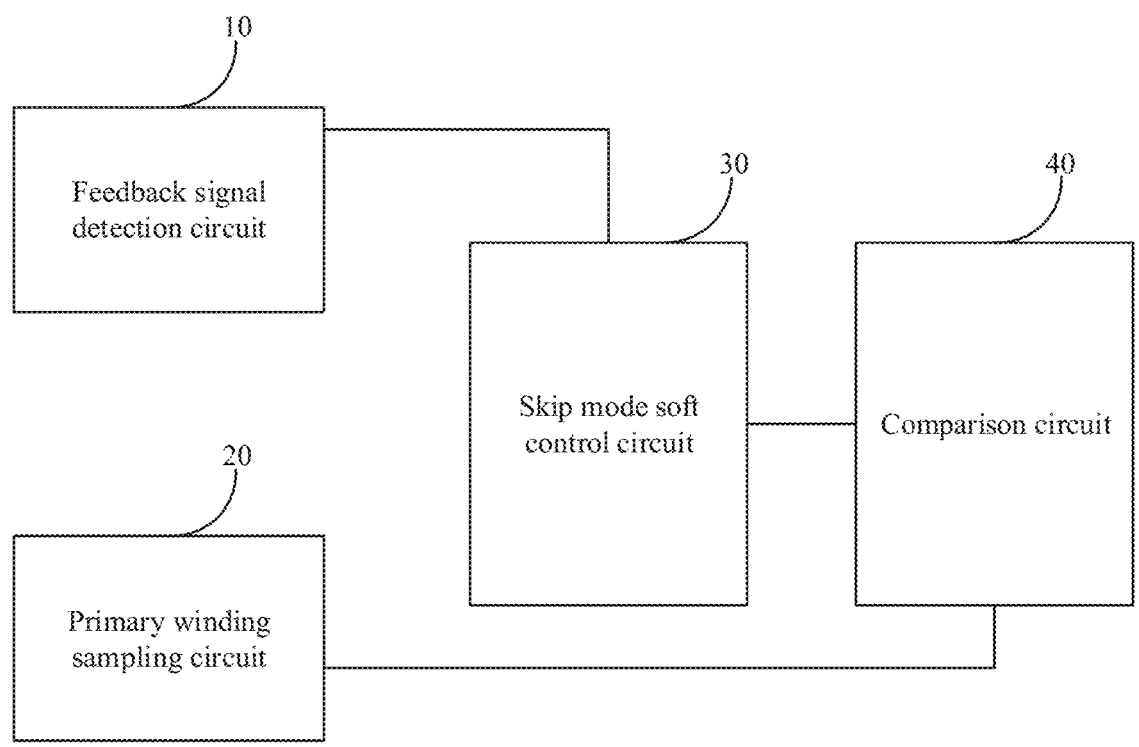
FIG. 1 is a schematic diagram of a system for controlling a skip mode of a switching power supply according to a first embodiment of the present disclosure.

Referring to FIG. 1, which is a schematic diagram of a system for controlling a skip mode of a switching power supply according to an embodiment of the present disclosure. As shown in FIG. 1, the system includes: a feedback signal detection circuit 10, a primary winding sampling circuit 20, a skip mode soft control circuit 30 and a comparison circuit 40.

Figure 2:
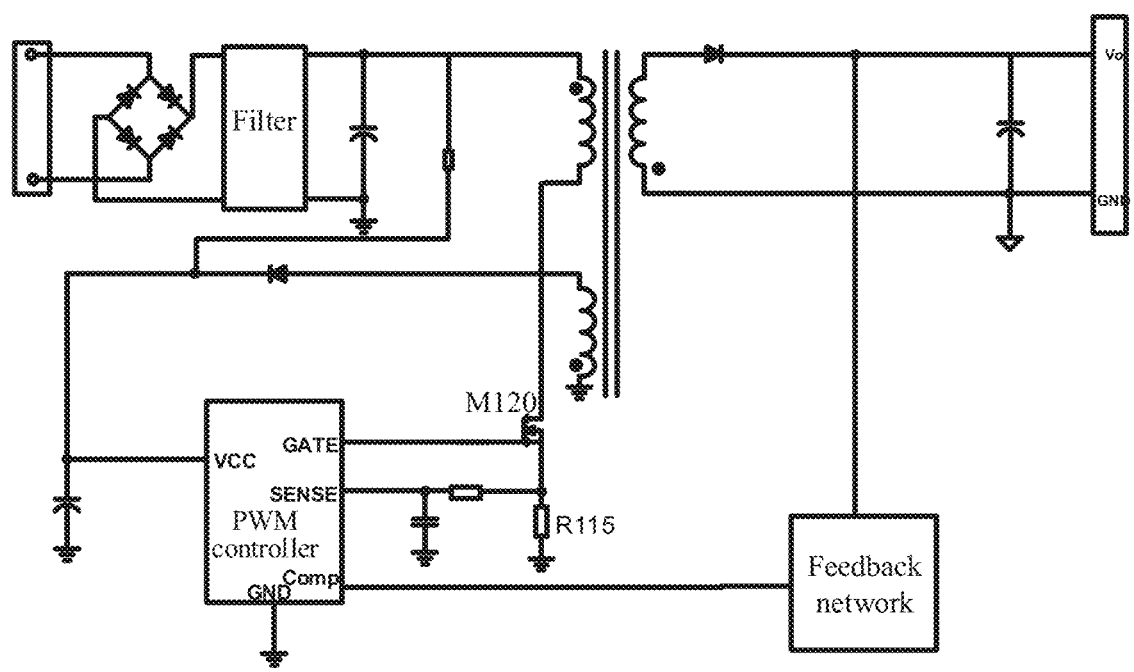
FIG. 2 is a schematic diagram of a system having a Flayback architecture according to an embodiment of the present disclosure.

The system for controlling a skip mode of a switching power supply according to the embodiment is applied to a PWM controller in a network having a Flyback architecture as shown in FIG. 2. In addition to the system including the feedback signal detection circuit 10, the primary winding sampling circuit 20, the skip mode soft control circuit 30 and the comparison circuit 40, the PWM controller further includes an oscillator, an SR trigger and a driver.

A Comp pin of the PWM controller is connected to a feedback network, and the feedback network is connected to a secondary winding of the switching power supply. A feedback signal from the secondary winding of the switching power supply is inputted to the Comp pin of the PWM controller. After the feedback signal of the secondary winding is inputted to the feedback signal detection circuit 10, the feedback signal detection circuit 10 may output two feedback signals Comp_out1 and Comp_out2. In one embodiment, after the feedback signal of the secondary winding is inputted to the feedback signal detection circuit 10, the feedback signal detection circuit 10 may output one feedback signal, that is, the feedback signals Comp_out1 and Comp_out2 may be combined into one feedback signal and then outputted.

In some embodiments, the feedback signal detection circuit 10 may include a voltage divider.

The primary winding sampling circuit 20 is coupled with a primary winding of the switching power supply and is configured to sample a sampling voltage of the primary winding.

In some embodiments, the primary winding sampling circuit 20 may include a compensator. A sampling voltage (represented by Vcs hereinafter) of a sampling resistor (R115 as shown in FIG. 2) connected to the primary winding is inputted to the compensator.

The skip mode soft control circuit 30 is configured to receive the feedback signal and output an electrical signal based on the feedback signal.

In some embodiments, the skip mode soft control circuit 30 includes a first comparator 301, a second comparator 302, a third comparator 303, a controller 304, and a multiplexer 305. The first comparator 301 is configured to compare the feedback signal with a soft activation voltage threshold. The second comparator 302 is configured to compare the feedback signal with a predetermined voltage threshold. The third comparator 303 is configured to compare the feedback signal with a soft exit voltage threshold. The controller 304 is configured to: when the feedback signal is greater than the soft activation voltage threshold, control the multiplexer 305 to output a first predetermined number of electrical signals, where the comparison circuit 40 outputs the first predetermined number of thresholds and the first predetermined number of thresholds increase successively; and when the feedback signal is less than the predetermined voltage threshold and greater than the soft exit voltage threshold, control the multiplexer 305 to output a second predetermined number of electrical signals, where the comparison circuit 40 outputs the second predetermined number of thresholds and the second predetermined number of thresholds decrease successively.

In the embodiment, the skip mode soft control circuit 30 includes the controller 304, the multiplexer 305 and three comparators. A positive input terminal of the first comparator 301, a positive input terminal of the second comparator 302 and a positive input terminal of the third comparator 303 are connected to an output terminal of the feedback signal detection circuit 10. The soft activation voltage threshold is inputted to a negative input terminal of the first comparator 301, the predetermined voltage threshold is inputted to a negative input terminal of the second comparator 302, and the soft exit voltage threshold is inputted to a negative input terminal of the third comparator 303. The soft activation voltage threshold is less than the predetermined voltage threshold, and the predetermined voltage threshold is less than the soft exit voltage threshold. An output terminal of the first comparator 301, an output terminal of the second comparator 302 and an output terminal of the third comparator 303 are connected to the controller 304. The controller 304 is connected to the multiplexer 305.

Figure 3:
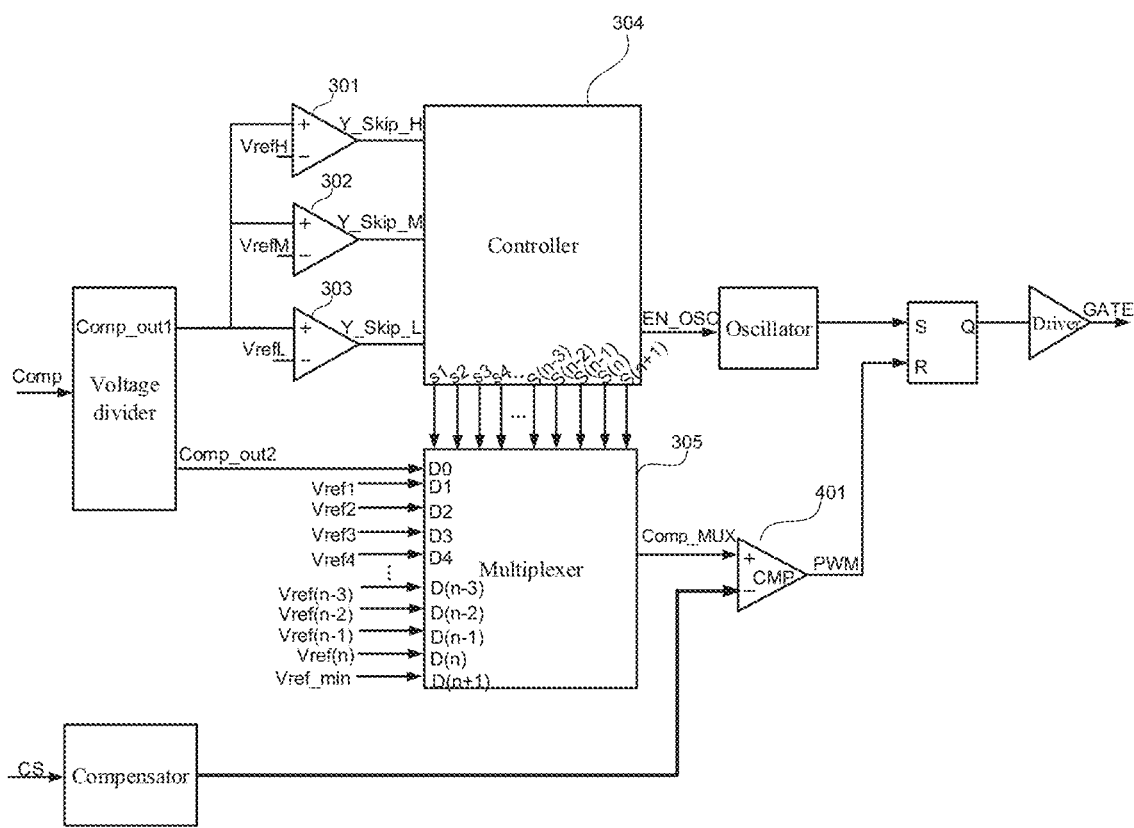
FIG. 3 is a schematic diagram of a system for controlling a skip mode of a switching power supply according to a second embodiment of the present disclosure.

Referring to FIG. 3, taking a feedback signal detection circuit 10 including a voltage divider and outputting two feedback signals Comp_out1 and Comp_out2 as an example, Comp_out1 is inputted to the positive input terminal of the first comparator 301, to the positive input terminal of the second comparator 302, and to the positive input terminal of the third comparator 303. The soft activation voltage threshold (VrefH shown in FIG. 3) is inputted to the negative input terminal of the first comparator 301, and an output signal (Y_Skip_H shown in FIG. 3) of the first comparator 301 is inputted to the controller 304. The predetermined voltage threshold (VrefM shown in FIG. 3) is inputted to the negative input terminal of the second comparator 302, and an output signal (Y_Skip_M shown in FIG. 3) of the second comparator 302 is inputted to the controller 304. The soft exit voltage threshold (VrefL shown in FIG. 3) is inputted to the negative input terminal of the third comparator 303, and an output signal (Y_Skip_L shown in FIG. 3) of the third comparator 303 is inputted to the controller 304.

The controller 304 generates a control signal for controlling an oscillator. For example, the control signal may be represented by EN_OSC. EN_OSC is inputted to the oscillator to control the oscillator to output a pulse or not output a pulse. An output of the oscillator is inputted to a Set terminal of an SR trigger. The SR trigger is connected to a driver. The driver drives a gate of a switch tube (M120 shown in FIG. 2) connected to the PWM controller 304.

In addition, the controller 304 generates multiple pulse signals, for example, represented by s1, s2, s3, s4, . . . s(n−3), s(n−2), s(n−1), s(n), and s(n+1) respectively. The pulse signals are inputted to the multiplexer 305. Then, the multiplexer 305 outputs a first predetermined number of electrical signals when the feedback signal is greater than the soft activation voltage threshold, where the first predetermined number of electrical signals change according to a first predetermined rule; and the multiplexer 305 outputs a second predetermined number of electrical signals when the feedback signal is less than the predetermined voltage threshold and greater than the soft exit voltage threshold, where the second predetermined number of electrical signals change according to a second predetermined rule. The electrical signals are voltage signals or current signals.

The comparison circuit 40 is configured to determine a threshold of the sampling voltage based on the electrical signal outputted by the skip mode soft control circuit 30 and the sampling voltage outputted by the primary winding, and the skip mode is activated when the feedback signal is greater than the soft activation voltage threshold, and the skip mode is pre-exited when the feedback signal is less than the predetermined voltage threshold and greater than the soft exit voltage threshold.

In some embodiments, the comparison circuit 40 includes a fourth comparator 401.

When the feedback signal is greater than the soft activation voltage threshold, the multiplexer 305 outputs the first predetermined number of electrical signals, and then the comparison circuit 40 determines the first predetermined number of thresholds for Vcs based on the first predetermined number of electrical signals. The first predetermined number of thresholds increase successively.

Since the thresholds for Vcs increase successively, Vcs increases gradually. It should be understood that Vcs is positively correlated with a peak current of the primary winding, so the gradual increase of Vcs indicates that the peak current of the primary winding increases gradually. Therefore, when activating the skip mode, the peak current of the primary winding may be increased gradually by increasing the threshold for Vcs.

When the feedback signal is less than the predetermined voltage threshold and greater than the soft exit voltage threshold, the multiplexer 305 outputs the second predetermined number of electrical signals, and then the fourth comparator 401 determines the second predetermined number of thresholds for Vcs based on the second predetermined number of electrical signals. The second predetermined number of thresholds decrease successively.

Since the thresholds for Vcs decrease successively, Vcs decreases gradually when the skip mode is pre-exited. Vcs is positively correlated with the peak current of the primary winding, and the gradual decrease of Vcs indicates that the peak current of the primary winding decreases gradually. Therefore, when pre-exiting the skip mode, the peak current of the primary winding may be decreased gradually by decreasing the threshold for Vcs.

When the feedback signal is less than the soft activation voltage threshold and greater than the predetermined voltage threshold, the threshold for the sampling voltage changes with the feedback signal.

When the feedback signal is less than the soft exit voltage threshold, the threshold for the sampling voltage changes with the feedback signal.

In summary, with the system for controlling a skip mode of a switching power supply according to the present disclosure, by using the skip mode soft control circuit 30 and the comparison circuit 40 and based on the feedback signal related to the output voltage of the switching power supply and the sampling voltage of the primary winding, the skip mode is activated when the feedback signal is greater than the soft activation voltage threshold, and the skip mode is pre-exited when the feedback signal is less than the predetermined voltage threshold and greater than the soft exit voltage threshold. After the skip mode is activated, the peak current of the primary winding increases gradually, avoiding the audio noise caused by large jumps in the peak current of the primary winding. After the skip mode is pre-exited, the peak current of the primary winding gradually decreases before exiting the skip mode, avoiding the audio noise caused by the large jumps in the peak current of the primary winding when exiting the skip mode.

Second Embodiment

In the embodiment, the multiplexer 305 outputs a voltage signal. The voltage signal outputted by the multiplexer 305 is inputted to a positive input terminal of the fourth comparator 401, and the sampling voltage is inputted to a negative input terminal of the fourth comparator 401. A signal terminal of the multiplexer 305 is connected to the output terminal of the feedback signal detection circuit 10. The multiplexer 305 outputs the feedback signal when the feedback signal is less than the soft activation voltage threshold and greater than the predetermined voltage threshold.

As shown in FIG. 3, Comp_out2 is inputted a terminal D0 of the multiplexer 305, and voltage signals Vref1 to Vref_min are respectively inputted to terminals D1 to D(n+1) of the multiplexer 305. The controller 304 outputs pulse signals s1 to s(n+1) to the multiplexer 305. The output terminal of the multiplexer 305 is connected to the positive input terminal of the fourth comparator 401, and the negative input terminal of the fourth comparator 401 is connected to an output terminal of the compensator. A threshold for Vcs is equal to a voltage signal outputted by the multiplexer 305.

Taking the first predetermined number being 4 and the second predetermined number being 4 as an example, when the skip mode is activated, the controller 304 outputs pulse signals s1 to s4 to the multiplexer 305, and the multiplexer 305 successively outputs voltage signals Vref1, Vref2, Vref3 and Vref4, where Vref1<Vref2<Vref3<Vref4. The multiplexer 305 successively outputs the voltage signals Vref1, Vref2, Vref3 and Vref4 to the positive input terminal of the fourth comparator 401. Vref1, Vref2, Vref3 and Vref4 successively serve as the threshold for Vcs, and Vcs gradually increases to close to the threshold.

In the controller 304 outputting pulse signals s5 to s(n−4) to the multiplexer 305, the multiplexer 305 continuously outputs Comp_out2 that is inputted to the terminal D0. In addition, in the controller 304 outputting pulse signals s5 to s(n−4) to the multiplexer 305, the multiplexer 305 continuously outputs Comp_out2 to the positive input terminal of the fourth comparator 401 as a threshold for Vcs.

When the skip mode is pre-exited, the controller 304 outputs pulse signals s(n−3) to s(n) to the multiplexer 305, and the multiplexer 305 successively outputs voltage signals Vref(n−3), Vref(n−2), Vref(n−1) and Vref(n), where Vref(n)<Vref(n−1)<Vref(n−2)<Vref(n−3). The multiplexer 305 successively outputs Vref(n−3), Vref(n−2), Vref(n−1) and Vref(n) to the positive input terminal of the fourth comparator 401. Vref(n−3), Vref(n−2), Vref(n−1) and Vref(n) successively serve as the threshold for Vcs, and Vcs gradually decreases to close to the threshold.

Figure 4:
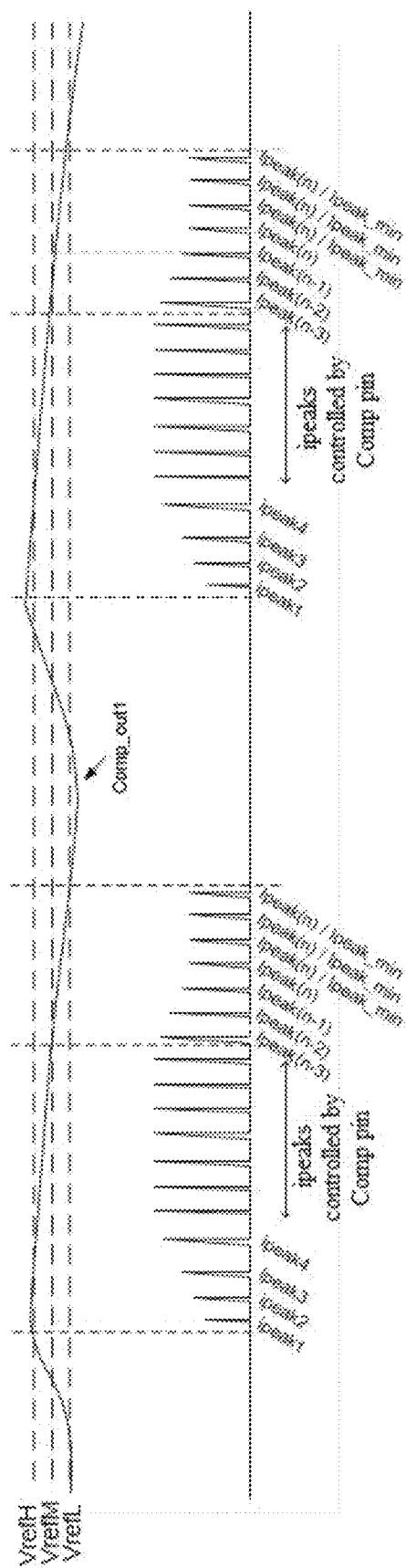
FIG. 4 is a schematic diagram showing peak currents of a primary winding according to a first embodiment of the present disclosure.

The variation of the peak current of the primary winding when the skip mode is activated or pre-exited are shown in FIG. 4, in which ipeak represents a peak current of the primary winding. When Comp_out1 is greater than VrefH, the output terminal Comp_MUX of the multiplexer 305 successively outputs Vref1, Vref2, Vref3 and Vref4 for controlling first several ipeaks. Then, ipeak is controlled based on Comp_out2. When Comp_out1 is less than VrefM and greater than VrefL, Comp_MUX successively outputs Vref(n−3), Vref(n−2), Vref(n−1) and Vref(n) for controlling the ipeak. Then, the ipeak is maintained as Vref_min, or is controlled based on Vref (n).

Third Embodiment

In the embodiment, the multiplexer 305 outputs a voltage signal. The feedback signal is inputted to the positive input terminal of the fourth comparator 401. A superposition of a voltage signal outputted by the multiplexer 305 and the sampling voltage is inputted to the negative input terminal of the fourth comparator 401. The signal terminal of the multiplexer 305 is not connected to the output terminal of the feedback signal detection circuit 10. When the feedback signal is less than the soft activation voltage threshold and greater than the predetermined voltage threshold, the multiplexer 305 continuously outputs a voltage equal to zero.

The voltage signal outputted by the multiplexer 305 is superimposed with the sampling voltage and then is compared with the feedback signal, which is equivalent to using a difference between the feedback signal and the voltage signal outputted by the multiplexer 305 as a threshold for the sampling voltage.

Figure 5:
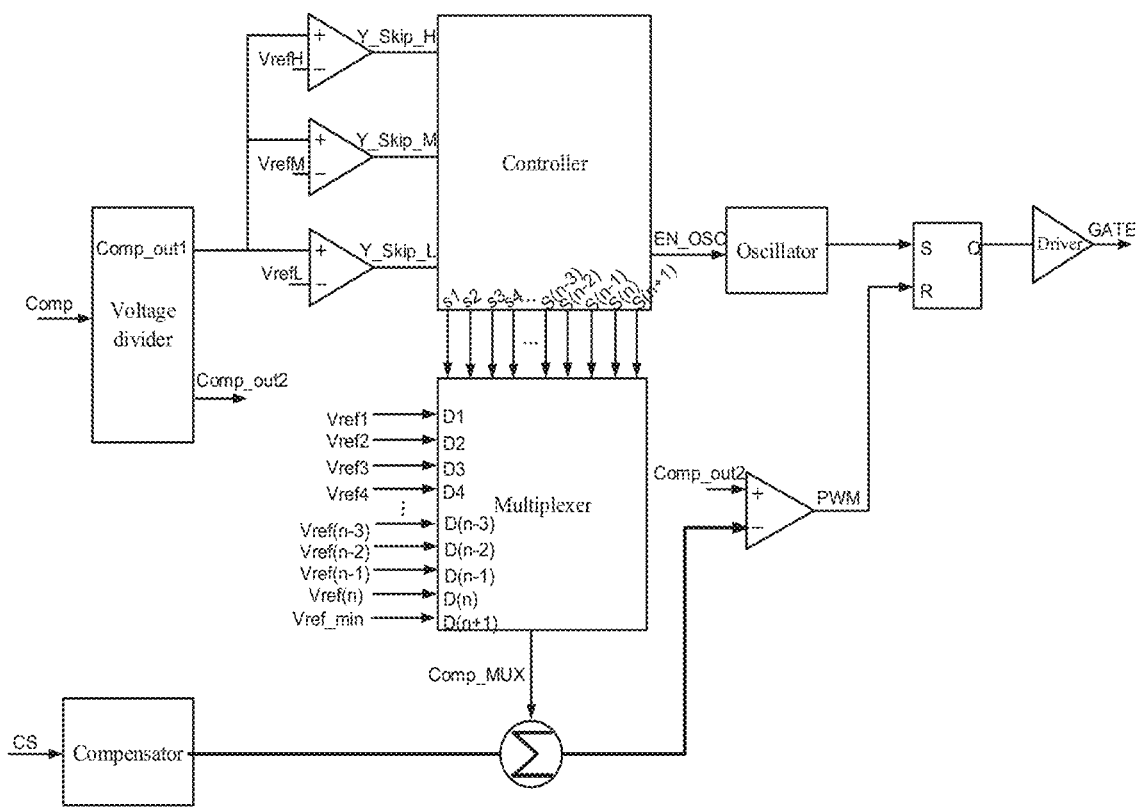
FIG. 5 is a schematic diagram of a system for controlling a skip mode of a switching power supply according to a third embodiment of the present disclosure.

As shown in FIG. 5, Comp_ou2 outputted by the feedback signal detection circuit 10 is inputted to the positive input terminal of the fourth comparator 401, and voltage signals Vref1 to Vref_min are respectively inputted to the terminals D1 to D(n+1) of the multiplexer 305. The controller 304 outputs pulse signals s1 to s(n+1) to the multiplexer 305. The voltage signal outputted by the multiplexer 305 is superimposed with Vcs, and then is inputted to the negative input terminal of the fourth comparator 401. In FIG. 5, a summation symbol represents a superposition of two voltage signals.

Figure 6:
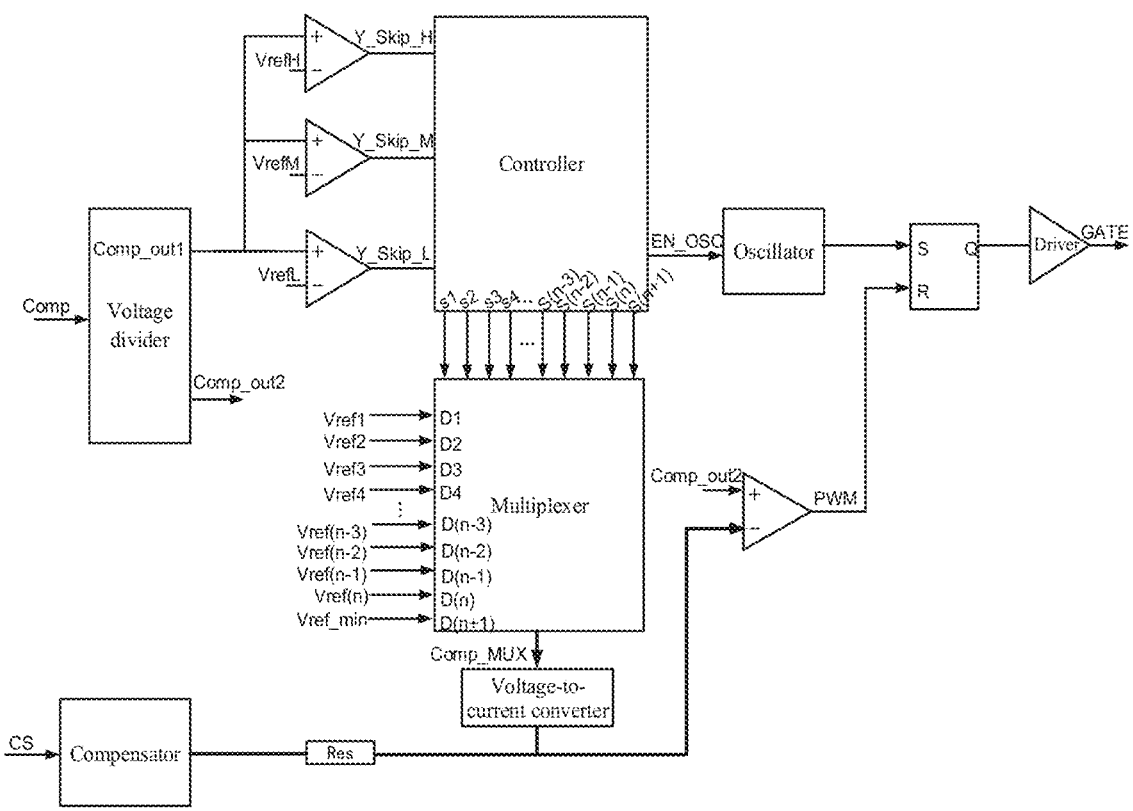
FIG. 6 is a schematic diagram showing voltage superposition performed by the system shown in FIG. 5 according to an embodiment of the present disclosure.

Referring to FIG. 6, the voltage signal outputted by the multiplexer 305 may be superimposed with Vcs by: converting a voltage signal outputted by the multiplexer 305 to a current signal, and inputting the current signal to one terminal of a resistor Res, where the other terminal of the resistor Res is connected to an output terminal of the compensator.

It should be understood that in addition to performing voltage superposition as shown in FIG. 6, two voltage signals may be superimposed together by using an in-phase summation circuit, an inverse phase summation circuit or the like.

Taking the first predetermined number being 4 and the second predetermined number being 4 as an example, the controller 304 outputs pulse signals s1 to s4 to the multiplexer 305, then the multiplexer 305 successively outputs Vref1, Vref2, Vref3 and Vref4, where Vref1>Vref2>Vref3>Vref4. Vref1, Vref2, Vref3 and Vref4 are respectively superimposed with Vcs, and then are successively inputted to the negative input terminal of the fourth comparator 401. Vref1, Vref2, Vref3 and Vref4, that have been superimposed with Vcs, are respectively compared with Comp_out2. Since Vref1>Vref2>Vref3>Vref4, Vcs gradually increases close to a value with which a voltage is superimposed is equal to Comp_out2.

In the controller 304 outputting pulse signals s5 to s(n−4) to the multiplexer 305, the multiplexer 305 continuously outputs a voltage equal to zero. In addition, in the controller 304 outputting pulse signals s5 to s(n−4) to the multiplexer 305, the voltage, equal to zero, outputted by the multiplexer 305 is superimposed with Vcs, and then is compared with Comp_out2, and the threshold for Vcs is equal to the value of Comp_out2.

The controller 304 outputs s(n−3) to s(n) to the multiplexer 305, then the multiplexer 305 successively outputs Vref(n−3), Vref(n−2), Vref(n−1) and Vref(n), where Vref (n)> Vref(n−1)>Vref(n−2)>Vref(n−3). Vref(n−3), Vref(n−2), Vref(n−1) and Vref(n) successively outputted by the multiplexer 305 are respectively superimposed with Vcs, and then are successively inputted to the negative input terminal of the fourth comparator 401. Comp_out2 is inputted to the positive input terminal of the fourth comparator 401. Vref(n−3), Vref(n−2), Vref(n−1) and Vref(n), that have been superimposed with Vcs, are respectively compared with Comp_out2. Since Vref(n)>Vref(n−1)>Vref(n−2)>Vref (n−3), Vcs gradually decreases close to a value with which a voltage is superimposed is equal to Comp_out2.

Fourth Embodiment

In the embodiment, the multiplexer 305 outputs a voltage signal. A superposition of a voltage signal outputted by the multiplexer 305 and the feedback signal is inputted to the positive input terminal of the fourth comparator 401. The sampling voltage is inputted to the negative input terminal of the fourth comparator 401. The signal terminal of the multiplexer 305 is not connected to the output terminal of the feedback signal detection circuit 10. When the feedback signal is less than the activation voltage threshold and greater than the predetermined voltage threshold, the multiplexer 305 continuously outputs a voltage equal to zero.

The voltage signal outputted by the multiplexer 305 is superimposed with the feedback signal and then is compared with the sampling voltage, which is equivalent to using a sum of the voltage signal outputted by the multiplexer 305 and the feedback signal as a threshold for the sampling voltage.

Figure 7:
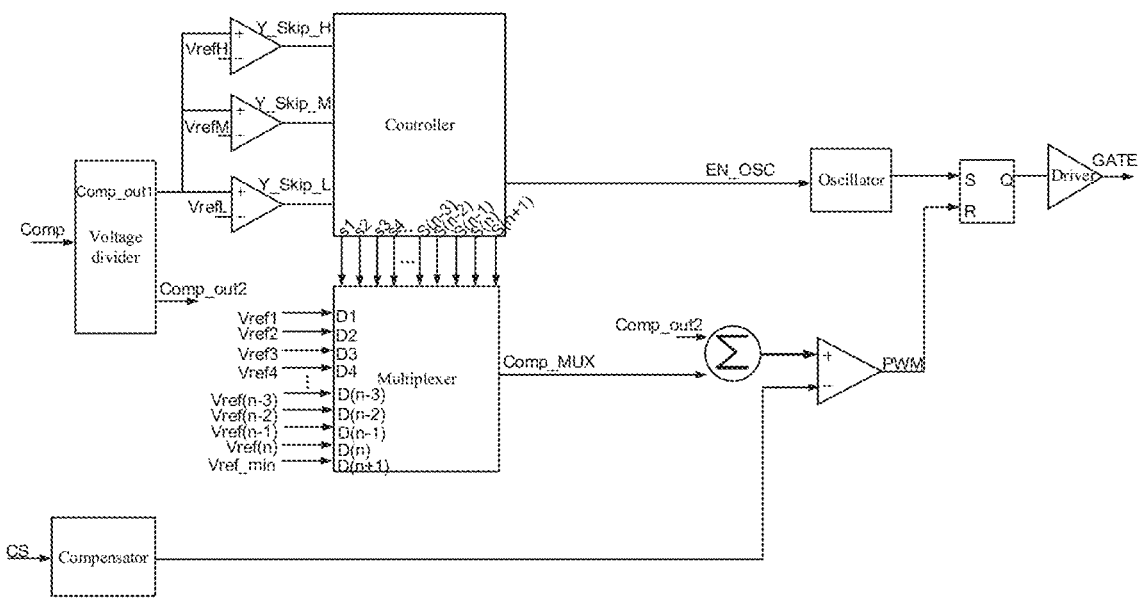
FIG. 7 is a schematic diagram of a system for controlling a skip mode of a switching power supply according to a fourth embodiment of the present disclosure.

As shown in FIG. 7, Vcs is inputted to the negative input terminal of the fourth comparator 401, and voltage signals Vref1 to Vref_min are respectively inputted to the terminals D1 to D(n+1) of the multiplexer 305. The controller 304 outputs pulse signals s1 to s(n+1) to the multiplexer 305. The voltage signal outputted by the multiplexer 305 is superimposed with Comp_out2, and then is inputted to the positive input terminal of the fourth comparator 401.

In FIG. 7, a summation symbol represents a superposition of two voltage signals. The voltage signal outputted by the multiplexer 305 may be superimposed with Comp_out2 by performing operations for superimposing voltage signals described in the above embodiments, which are not repeated herein.

Taking the first predetermined number being 4 and the second predetermined number being 4 as an example, the controller 304 outputs pulse signals s1 to s4 to the multiplexer 305, then the multiplexer 305 successively outputs Vref1, Vref2, Vref3 and Vref4, where Vref1<Vref2<Vref3<Vref4. Vref1, Vref2, Vref3 and Vref4, successively outputted by the multiplexer 305, are respectively superimposed with Comp_out2, and then are successively inputted to the positive input terminal of the fourth comparator 401. Vcs is inputted to the negative input terminal of the fourth comparator 401. Vref1, Vref2, Vref3 and Vref4, that have been superimposed with Comp_out2, are respectively compared with Vcs. Since Vref1<Vref2<Vref3<Vref4, Vcs gradually increases close to a value of a superimposed voltage.

In the controller 304 outputting pulse signals s5 to s(n−4) to the multiplexer 305, the multiplexer 305 continuously outputs a voltage equal to zero. In addition, in the controller 304 outputting pulse signals s5 to s(n−4) to the multiplexer 305, the voltage, equal to zero, outputted by the multiplexer 305 is superimposed with Comp_out2, and then is compared with Vcs, and the threshold for Vcs is equal to the value of Comp_out2.

The controller 304 outputs s(n−3) to s(n) to the multiplexer 305, then the multiplexer 305 successively outputs Vref(n−3), Vref(n−2), Vref(n−1) and Vref(n), where Vref(n)<Vref(n−1)<Vref(n−2)<Vref(n−3). Vref(n−3), Vref(n−2), Vref(n−1) and Vref(n) successively outputted by the multiplexer 305 are respectively superimposed with Comp_out2, and then are successively inputted to the positive input terminal of the fourth comparator 401. Vcs is inputted to the negative input terminal of the fourth comparator 401. Vref(n−3), Vref(n−2), Vref(n−1) and Vref(n), that have been superimposed with Comp_out2, are respectively compared with Vcs. Since Vref(n)<Vref(n−1)<Vref(n−2)<Vref(n−3), Vcs gradually decreases close to a value of a superimposed voltage.

Fifth Embodiment

In the embodiment, the multiplexer 305 outputs a current signal. A voltage signal, converted from a current signal outputted by the multiplexer 305, is inputted to the positive input terminal of the fourth comparator 401. The sampling voltage is inputted to the negative input terminal of the fourth comparator 401.

Figure 8:
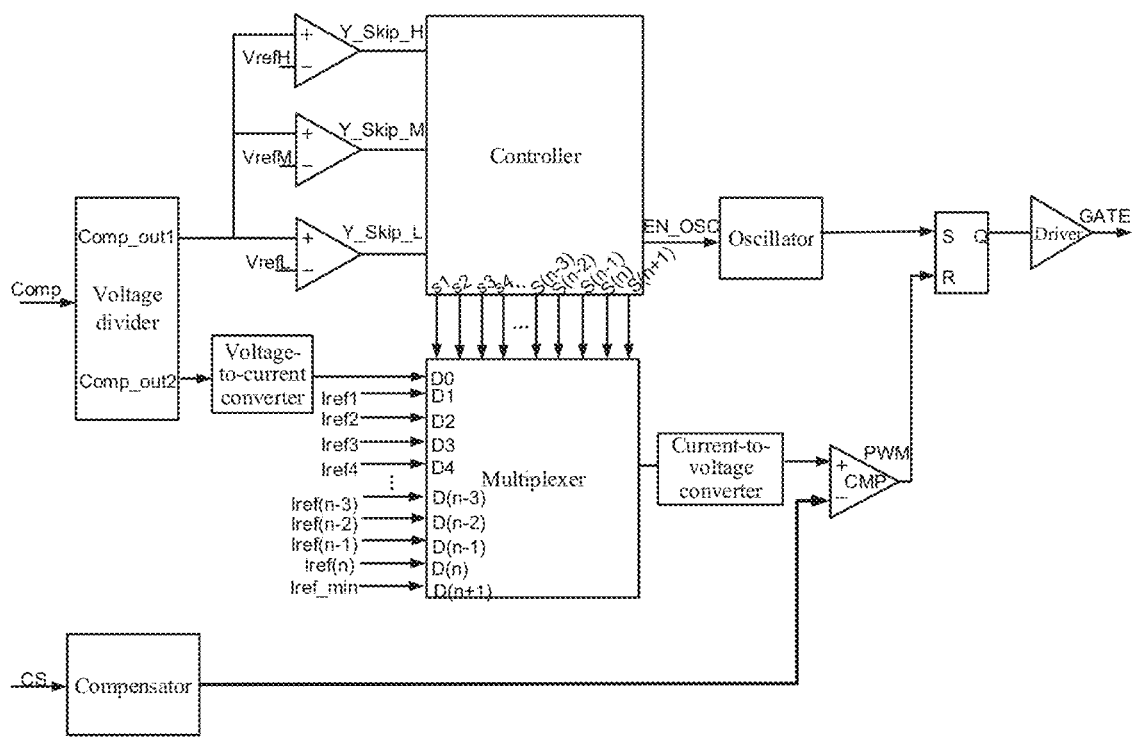
FIG. 8 is a schematic diagram of a system for controlling a skip mode of a switching power supply according to a fifth embodiment of the present disclosure.

Referring to FIG. 8, Comp_out2 outputted by the feedback signal detection circuit 10 is converted to a current signal, and then is inputted to a terminal D0 of the multiplexer 305. Current signals Iref1 to Iref_min are respectively inputted to terminals D1 to D(n+1) of the multiplexer 305. The controller 304 outputs pulse signals s1 to s(n+1) to the multiplexer 305. The output terminal of the multiplexer 305 is connected to a current-to-voltage converter. An output terminal of the current-to-voltage converter is connected to the positive input terminal of the fourth comparator 401. The negative input terminal of the fourth comparator 401 is connected to an output terminal of the compensator.

Taking the first predetermined number being 4 and the second predetermined number being 4 as an example, the controller 304 outputs pulse signals s1 to s4 to the multiplexer 305, then the multiplexer 305 successively outputs Iref1, Iref2, Iref3 and Iref4, where Iref1<Iref2<Iref3<Iref4. The multiplexer 305 successively outputs Iref1, Iref2, Iref3 and Iref4 to an input terminal of the current-to-voltage converter. The current-to-voltage converter successively outputs Vref1, Vref2, Vref3 and Vref4, which are respectively obtained by converting Iref1, Iref2, Iref3 and Iref4, to the positive input terminal of the fourth comparator 401 as the threshold for Vcs. Since Iref1<Iref2<Iref3<Iref4, Vref1<Vref2<Vref3<Vref4, and Vcs gradually increases In the controller 304 outputting pulse signals s5 to s(n−4) to the multiplexer 305, the multiplexer 305 continuously outputs a current signal obtained by converting Comp_out2. Then, the current-to-voltage converter converts the current signal to Comp_out2 and outputs Comp_out2. In addition, in the controller 304 outputting pulse signals s5 to s(n−4) to the multiplexer 305, Comp_out2 is inputted to the positive input terminal of the fourth comparator 401 as the threshold for Vcs.

The controller 304 outputs s(n−3) to s(n) to the multiplexer 305, then the multiplexer 305 successively outputs Iref(n−3), Iref(n−2), Iref(n−1) and Iref(n), where Iref(n)<Iref(n−1)<Iref(n−2)<Iref(n−3). The multiplexer 305 successively outputs Iref(n−3), Iref(n−2), Iref(n−1) and Iref(n) to the current-to-voltage converter, and then the current-to-voltage converter successively outputs Vref(n−3), Vref(n−2), Vref(n−1) and Vref(n), which are respectively obtained by converting Iref(n−3), Iref(n−2), Iref(n−1) and Iref(n), to the positive input terminal of the fourth comparator 401 respectively as the threshold for Vcs. Since Iref(n)<Iref(n−1)<Iref(n−2)<Iref(n−3), Vref(n)<Vref(n−1)<Vref(n−2)<Vref(n−3), and Vcs gradually decreases.

Sixth Embodiment

In the embodiment, the multiplexer 305 outputs a current signal. The feedback signal is inputted to the positive input terminal of the fourth comparator 401. A superposition of a voltage signal converted from a current signal outputted by the multiplexer 305 and the sampling voltage is inputted to the negative input terminal of the fourth comparator 401.

The voltage signal, converted from the current signal, is superimposed with the sampling voltage, and then is compared with the feedback signal, which is equivalent to using a difference between the feedback signal and the voltage signal converted from the current signal as a threshold for the sampling voltage.

Figure 9:
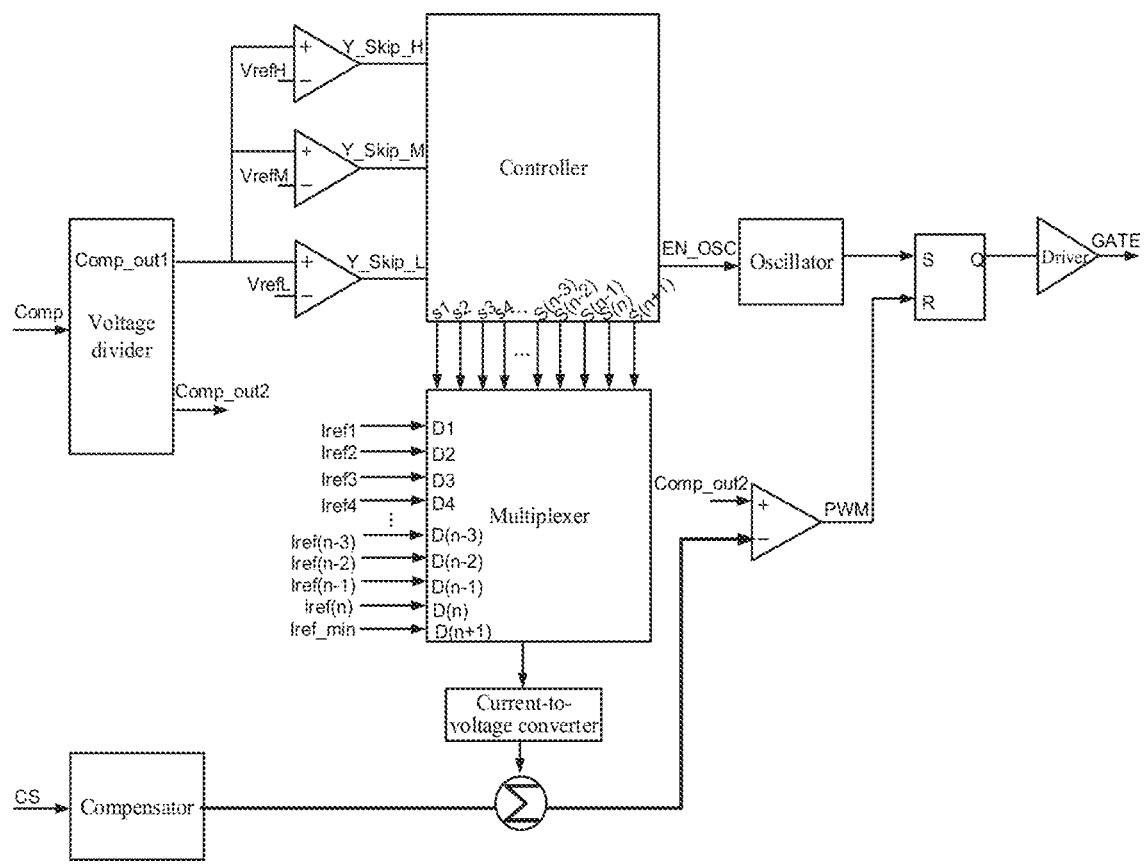
FIG. 9 is a schematic diagram of a system for controlling a skip mode of a switching power supply according to a sixth embodiment of the present disclosure.

As shown in FIG. 9, the feedback signal detection circuit 10 outputs Comp_ou2 to the positive input terminal of the fourth comparator 401, and current signals Iref1 to Iref_min are respectively inputted to the terminals D1 to D(n+1) of the multiplexer 305. The controller 304 outputs pulse signals s1 to s(n+1) to the multiplexer 305. A current signal outputted by the multiplexer 305 is converted to a voltage signal, and is superimposed with Vcs, and then is inputted to the negative input terminal of the fourth comparator 401.

Figure 10:
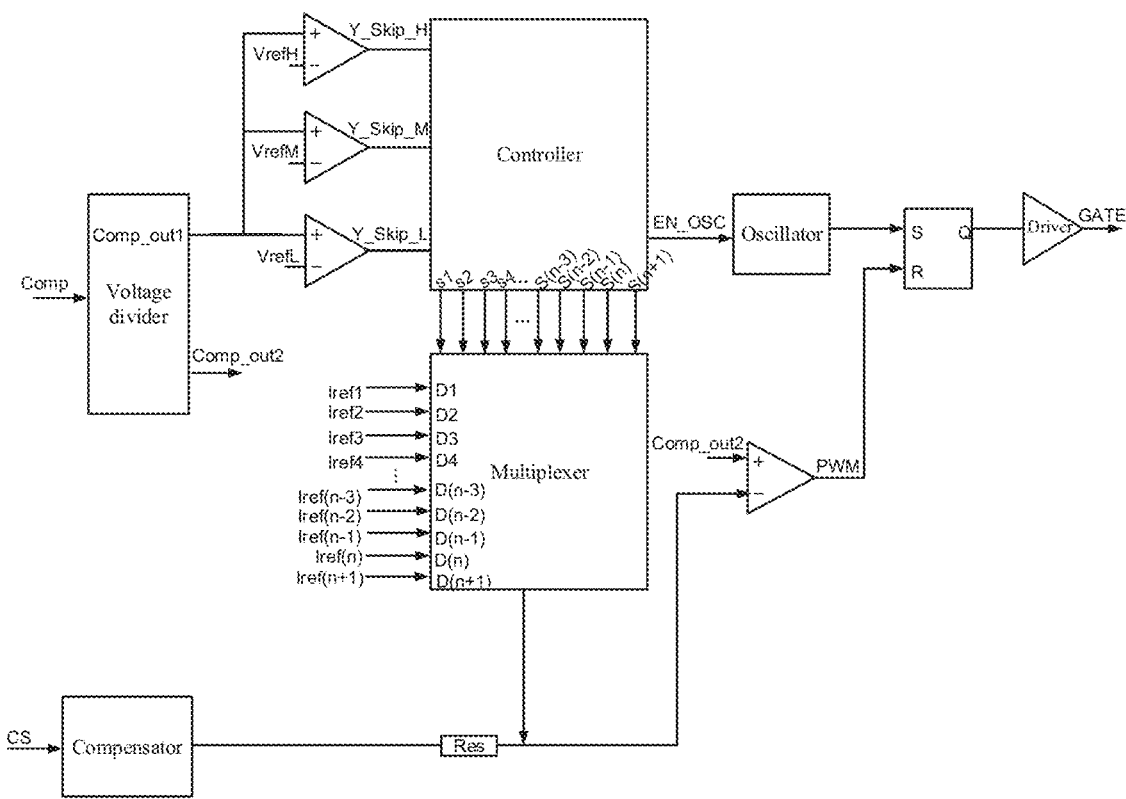
FIG. 10 is a schematic diagram showing voltage superimposition performed by the system shown in FIG. 9 according to an embodiment of the present disclosure.

Referring to FIG. 10, voltage signals may be superimposed by directly inputting a current signal outputted by the multiplexer 305 to one terminal of a resistor Res and connecting the other terminal of the resistor Res to an output terminal of a compensator.

Taking the first predetermined number being 4 and the second predetermined number being 4 as an example, the controller 304 outputs pulse signals s1 to s4 to the multiplexer 305, then the multiplexer 305 successively outputs Iref1, Iref2, Iref3 and Iref4, where Iref1>Iref2>Iref3>Iref4. The multiplexer 305 successively outputs Iref1, Iref2, Iref3 and Iref4 to one terminal of the resistor Res and the other terminal of the resistor Res is connected to the compensator, which is equivalent to converting current signals to voltage signals and then superimposing the voltage signals with Vcs. The voltage signals superimposed with Vcs are inputted to the negative input terminal of the fourth comparator 401. Comp_out2 is inputted to the positive input terminal of the fourth comparator 401. The voltage signals superimposed with Vcs are respectively compared with Comp_out2. Since Iref1>Iref2>Iref3>Iref4, Vcs gradually increases close to a value with which a voltage is superimposed is equal to Comp_out2.

In the controller 304 outputting pulse signals s5 to s(n−4) to the multiplexer 305, the multiplexer 305 continuously outputs a current equal to zero. In addition, in the controller 304 outputting pulse signals s5 to s(n−4) to the multiplexer 305, Vcs is compared with Comp_out2, and the threshold for Vcs is equal to the value of Comp_out2.

The controller 304 outputs s(n−3) to s(n) to the multiplexer 305, then the multiplexer 305 successively outputs Iref(n−3), Iref(n−2), Iref(n−1) and Iref(n), where Iref(n)>Iref(n−1)>Iref(n−2)>Iref(n−3). The multiplexer 305 successively outputs Iref(n−3), Iref(n−2), Iref(n−1) and Iref(n) to one terminal of the resistor Res and the other terminal of the resistor Res is connected to the compensator, which is equivalent to converting current signals to voltage signals and then superimposing the voltage signals with Vcs. The voltage signals superimposed with Vcs are inputted to the negative input terminal of the fourth comparator 401. Comp_out2 is inputted to the positive input terminal of the fourth comparator 401. The voltage signals superimposed with Vcs are respectively compared with Comp_out2. Since Iref(n)>Iref(n−1)>Iref(n−2)>Iref(n−3), Vcs gradually decreases close to a value with which a voltage is superimposed is equal to Comp_out2.

Seventh Embodiment

In the embodiment, the multiplexer 305 outputs a current signal. A superposition of a voltage signal converted from a current signal outputted by the multiplexer 305 and the feedback signal is inputted to the positive input terminal of the fourth comparator 401. The sampling voltage is inputted to the negative input terminal of the fourth comparator 401.

The voltage signal, converted from the current signal, is superimposed with the feedback signal, and then is compared with the sampling voltage, which is equivalent to using a sum of the feedback signal and the voltage signal converted from the current signal as a threshold for the sampling voltage.

Figure 11:
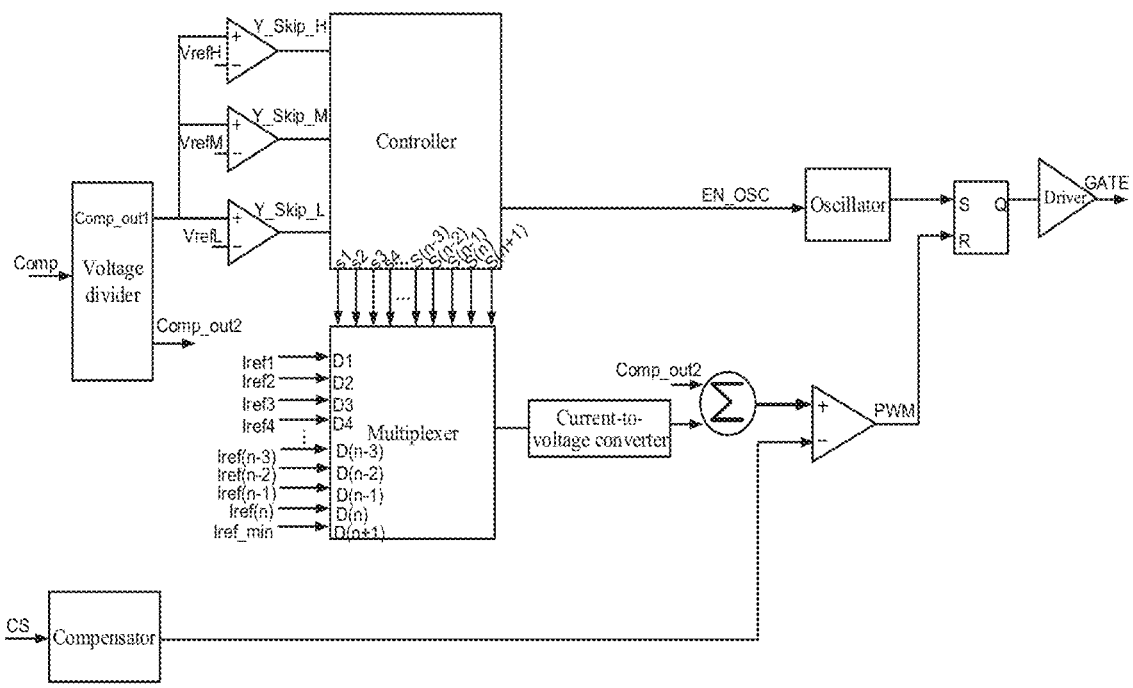
FIG. 11 is a schematic diagram of a system for controlling a skip mode of a switching power supply according to a seventh embodiment of the present disclosure.

As shown in FIG. 11, Vcs is inputted to the negative input terminal of the fourth comparator 401, and current signals Iref1 to Iref_min are respectively inputted to the terminals D1 to D(n+1) of the multiplexer 305. The controller 304 outputs pulse signals s1 to s(n+1) to the multiplexer 305. The current signal outputted by the multiplexer 305 is converted to a voltage signal, and then is superimposed with Comp_out2. The voltage signal superimposed with Comp_out2 is inputted to the positive input terminal of the fourth comparator 401.

In FIG. 11, a summation symbol represents a superposition of two voltage signals. The voltage signal converted from the current signal may be superimposed with Comp_out2 by: inputting the current signal outputted by the multiplexer 305 to one terminal of a resistor and inputting a current signal converted from Comp_out2 to the other terminal of the resistor. Thus, the current-to-voltage converter shown in FIG. 11 is unnecessary.

Taking the first predetermined number being 4 and the second predetermined number being 4 as an example, the controller 304 outputs pulse signals s1 to s4 to the multiplexer 305, then the multiplexer 305 successively outputs Iref1, Iref2, Iref3 and Iref4, where Iref1<Iref2<Iref3<Iref4. The multiplexer 305 successively outputs Iref1, Iref2, Iref3 and Iref4 to one terminal of the resistor and the current signal converted from Comp_out2 is inputted to the other terminal of the resistor, which is equivalent to converting current signals to voltage signals and then superimposing the voltage signals with Comp_out2. The voltage signals superimposed with Comp_out2 are inputted to the positive input terminal of the fourth comparator 401. Vcs is inputted to the negative input terminal of the fourth comparator 401. The voltage signals superimposed with Comp_out2 are respectively compared with Vcs. Since Iref1<Iref2<Iref3<Iref4, the voltage signals superimposed with Comp_out2 increases, and Vcs gradually increases close to a value of a superimposed voltage.

In the controller 304 outputting pulse signals s5 to s(n−4) to the multiplexer 305, the multiplexer 305 continuously outputs a current equal to zero. In addition, in the controller 304 outputting pulse signals s5 to s(n−4) to the multiplexer 305, Vcs is compared with Comp_out2, and the threshold for Vcs is equal to the value of Comp_out2.

The controller 304 outputs s(n−3) to s(n) to the multiplexer 305, then the multiplexer 305 successively outputs Iref(n−3), Iref(n−2), Iref(n−1) and Iref(n), where Iref(n)<Iref(n−1)<Iref(n−2)<Iref(n−3). The multiplexer 305 successively outputs Iref(n−3), Iref(n−2), Iref(n−1) and Iref(n) to one terminal of the resistor and the current signal converted from Comp_out2 is inputted to the other terminal of the resistor, which is equivalent to converting current signals to voltage signals and then superimposing the voltage signals with Comp_out2. The voltage signals superimposed with Comp_out2 are inputted to the positive input terminal of the fourth comparator 401. Vcs is inputted to the negative input terminal of the fourth comparator 401. Since Iref(n)<Iref(n−1)<Iref(n−2)<Iref(n−3), the voltage signals superimposed with Comp_out2 decrease, and Vcs gradually decreases close to a value of a superimposed voltage.

Eighth Embodiment

Figure 12:
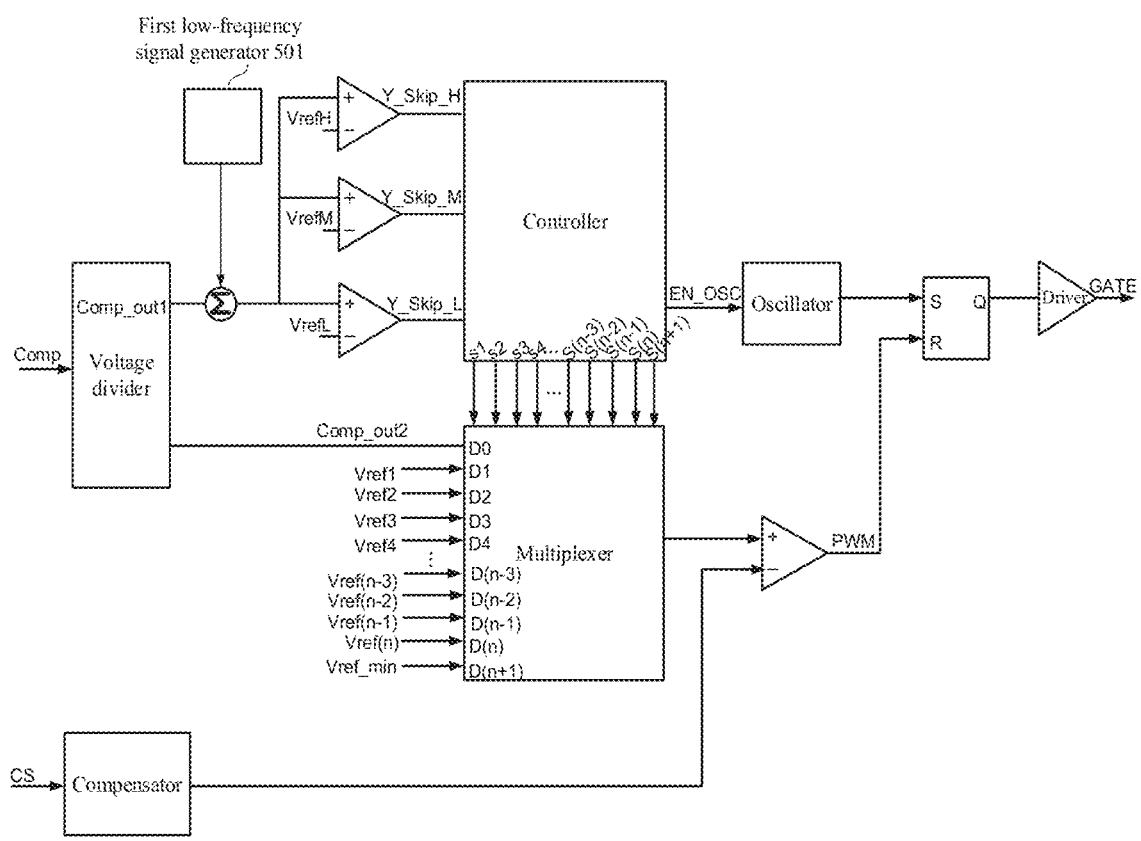
FIG. 12 is a schematic diagram of a system for controlling a skip mode of a switching power supply according to an eighth embodiment of the present disclosure.

Referring to FIG. 12, in the embodiment, the system for controlling a skip mode of a switching power supply further includes a first low-frequency signal generator 501. The first low-frequency signal generator 501 is connected to an output terminal of the feedback signal detection circuit 10. A low-frequency signal outputted by the first low-frequency signal generator 501 is superimposed with a signal outputted by the feedback signal detection circuit 10, and then is inputted to the positive input terminal of the first comparator 301, to the positive input terminal of the second comparator 302, and to the positive input terminal of the third comparator 303.

Figure 13:
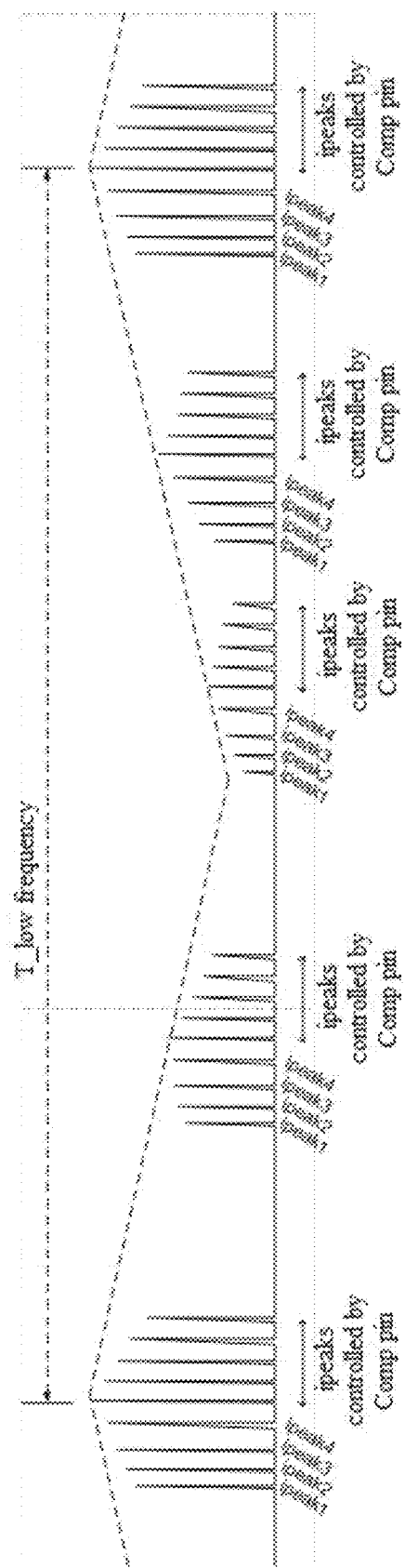
FIG. 13 is a schematic diagram showing peak currents of a primary winding according to a second embodiment of the present disclosure.
Figure 14:
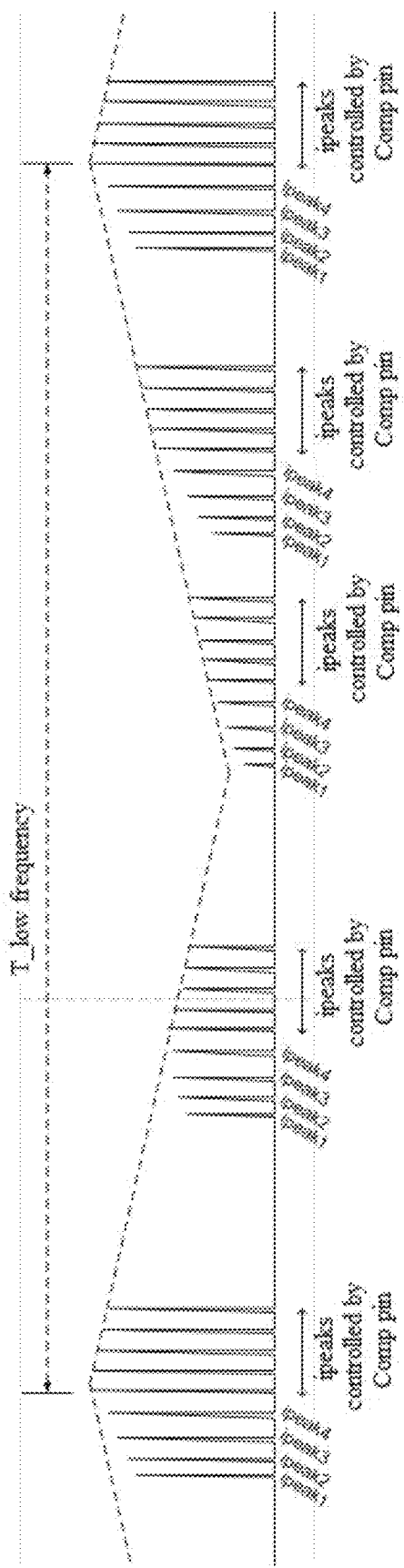
FIG. 14 is a schematic diagram showing peak currents of a primary winding according to a third embodiment of the present disclosure.

The low-frequency signal outputted by the first low-frequency signal generator 501 may be a triangular wave, a sine wave, a sawtooth wave and the like. Pulses are embedded in an envelope of the low-frequency signal, achieving a good effect. Taking the low-frequency signal being a triangle wave as an example, the combination of pulses and the low-frequency signal has the following three cases. In a first case, both upward soft ipeaks and downward soft ipeaks are included in the low-frequency signal and each cluster of pulses (as shown in FIG. 13). In a second case, only upward soft ipeaks are included in the low-frequency signal and each cluster of pulses (as shown in FIG. 14). In a third case, only downward soft ipeaks are included in the low-frequency signal and each cluster of pulses. T_low frequency in FIG. 13 and FIG. 14 indicates the frequency.

Ninth Embodiment

Figure 15:
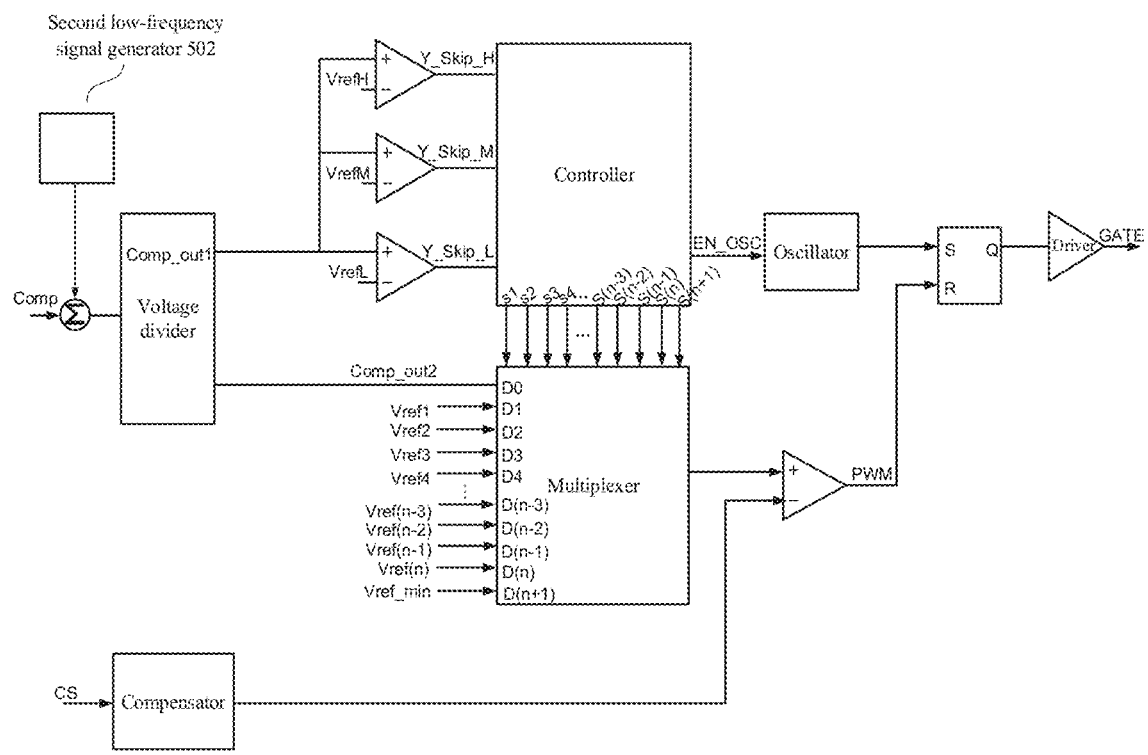
FIG. 15 is a schematic diagram of a system for controlling a skip mode of a switching power supply according to a ninth embodiment of the present disclosure.

Referring to FIG. 15, in the embodiment, the system for controlling a skip mode of a switching power supply further includes a second low-frequency signal generator 502. The second low-frequency signal generator 502 is connected to an input terminal of the feedback signal detection circuit 10. A low-frequency signal outputted by the second low-frequency signal generator 502 is superimposed with a signal inputted to the feedback signal detection circuit 10.

The low-frequency signal outputted by the second low-frequency signal generator 502 may be a triangular wave, a sine wave, a sawtooth wave and the like. Taking the low-frequency signal being a triangle wave as an example, the combination of pulses and the low-frequency signal has the following three cases. In a first case, both upward soft ipeaks and downward soft ipeaks are included in the low-frequency signal and each cluster of pulses (as shown in FIG. 13). In a second case, only upward soft ipeaks are included in the low-frequency signal and each cluster of pulses (as shown in FIG. 14). In a third case, only downward soft ipeaks are included in the low-frequency signal and each cluster of pulses.

Tenth Embodiment

Figure 16:
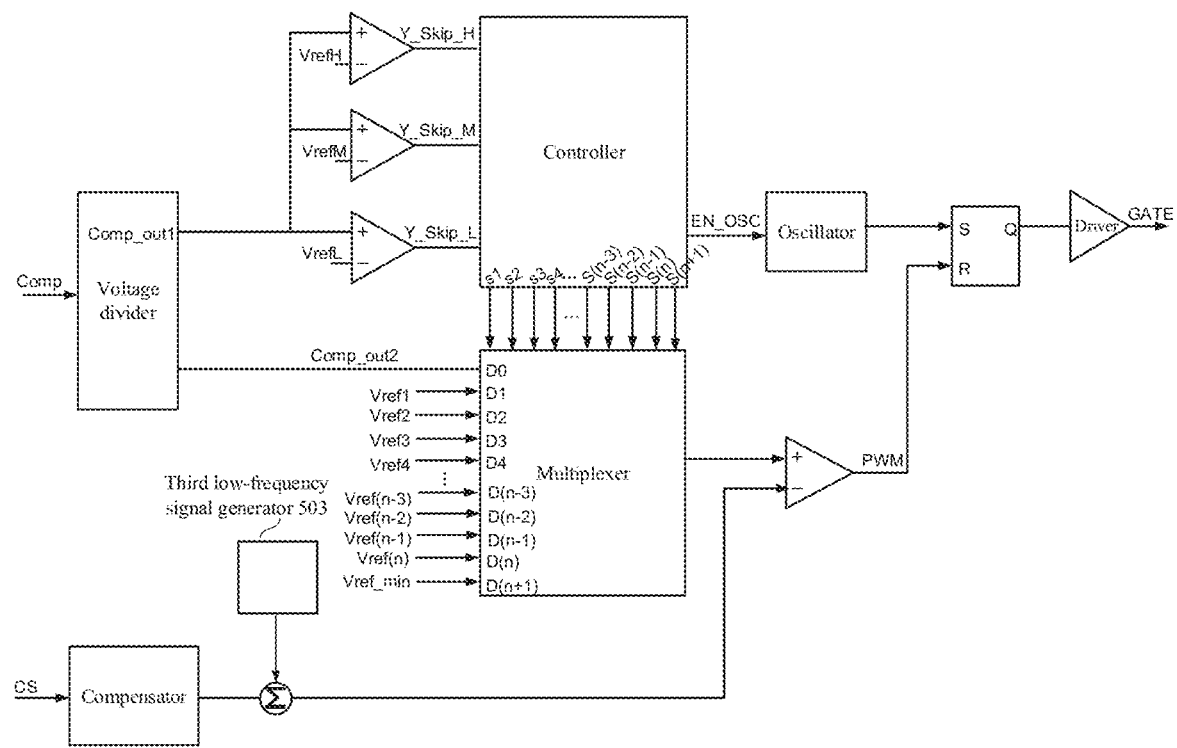
FIG. 16 is a schematic diagram of a system for controlling a skip mode of a switching power supply according to a tenth embodiment of the present disclosure.

Referring to FIG. 16, in the embodiment, the system for controlling a skip mode of a switching power supply further includes a third low-frequency signal generator 503. The third low-frequency signal generator 503 is connected to an output terminal of a compensator. A low-frequency signal outputted by the third low-frequency signal generator 503 is superimposed with a signal outputted by the compensator.

The low-frequency signal outputted by the third low-frequency signal generator 503 may be a triangular wave, a sine wave, a sawtooth wave and the like. Taking the low-frequency signal being a triangle wave as an example, the combination of pulses and the low-frequency signal has the following three cases. In a first case, both upward soft ipeaks and downward soft ipeaks are included in the low-frequency signal and each cluster of pulses (as shown in FIG. 13). In a second case, only upward soft ipeaks are included in the low-frequency signal and each cluster of pulses (as shown in FIG. 14). In a third case, only downward soft ipeaks are included in the low-frequency signal and each cluster of pulses.

A PWM controller is further provided according to the present disclosure. The PWM controller includes the system for controlling a skip mode of a switching power supply according to any one of the above embodiments. The PWM controller according to the present disclosure is not described in detail herein, and reference is made to the above embodiments.

The embodiments in the present disclosure are described in a progressive manner, each of the embodiments emphasizes the differences from others, and the same or similar parts among the embodiments may be referred to each other. Descriptions of the apparatus, the device and the computer readable storage medium disclosed in the embodiments are simple since they correspond to the method disclosed in the embodiments, and related explanations may be referred to the descriptions of the method.

It should further noted that, units and algorithm steps of examples described in conjunction with the embodiments disclosed herein may be implemented by electronic hardware, computer software or a combination thereof. In order to clearly illustrate interchangeability of the hardware and the software, steps and elements of each embodiment have been described generally in terms of functions in the above description. Whether these functions are performed in hardware or software depends on the specific application and design constraints for the embodiments. Different methods may be used to implement the described functions for each particular application, and such implementation should not be regarded as departing from the scope of the present disclosure.

Steps of the method or algorithm described in the embodiments herein may be directly implemented by hardware, a software module executed by a processor, or a combination thereof. The software module may be stored in a random access memory (RAM), a memory, a read-only memory (ROM), an electrical programmable ROM, an electrically erasable programmable ROM, a register, a hardware disk, a removable magnetic disk, a CD-ROM, or any other forms of storage medium well known in the art.

The system for controlling a skip mode of a switching power supply and the PWM controller according to the present disclosure are described in detail above. Principles and embodiments of the present disclosure are described herein through specific examples. Description of the above embodiments is merely used to facilitate understanding the method and concept of the present disclosure. It should be noted that improvements and modifications may be made to the present disclosure. These improvements and modifications shall fall within the scope of the claims of the present disclosure.

The invention claimed is:

1. A system for controlling a skip mode of a switching power supply, comprising:
a feedback signal detection circuit, configured to detect an output voltage of the switching power supply and generate a feedback signal related to the output voltage;
a primary winding sampling circuit, coupled with a primary winding of the switching power supply and configured to obtain a sampling voltage of the primary winding;
a skip mode soft control circuit, configured to receive the feedback signal and output an electrical signal; and
a comparison circuit, configured to determine a threshold for the sampling voltage based on the electrical signal and the sampling voltage; wherein the skip mode is activated when the feedback signal is greater than a soft activation voltage threshold, and the skip mode is pre-exited when the feedback signal is less than a predetermined voltage threshold and greater than a soft exit voltage threshold.

2. The system according to claim 1, wherein
the skip mode soft control circuit comprises a first comparator, a second comparator, a third comparator, a controller, and a multiplexer;
the first comparator is configured to compare the feedback signal with the soft activation voltage threshold;
the second comparator is configured to compare the feedback signal with the predetermined voltage threshold;
the third comparator is configured to compare the feedback signal with the soft exit voltage threshold; and
the controller is configured to:
when the feedback signal is greater than the soft activation voltage threshold, control a multiplexer to output a first predetermined number of electrical signals, wherein the comparison circuit outputs a first predetermined number of thresholds and the first predetermined number of thresholds increase successively; and
when the feedback signal is less than the predetermined voltage threshold and greater than the soft exit voltage threshold, control the multiplexer to output a second predetermined number of electrical signals, wherein the comparison circuit outputs a second predetermined number of thresholds and the second predetermined number of thresholds decrease successively.

3. The system according to claim 2, wherein a signal terminal of the multiplexer is connected to an output terminal of the feedback signal detection circuit, and the multiplexer outputs the feedback signal when the feedback signal is less than the soft activation voltage threshold and greater than the predetermined voltage threshold.

4. The system according to claim 2, wherein a signal terminal of the multiplexer is not connected to an output terminal of the feedback signal detection circuit, and the multiplexer continuously outputs a voltage equal to zero or a current equal to zero when the feedback signal is less than the soft activation voltage threshold and greater than the predetermined voltage threshold.

5. The system according to claim 1, wherein when the feedback signal is less than the soft activation voltage threshold and greater than the predetermined voltage threshold, the threshold for the sampling voltage is equal to the feedback signal.

6. The system according to claim 1, wherein when the feedback signal is less than the soft exit voltage threshold, the threshold for the sampling voltage is equal to the feedback signal.

7. The system according to claim 1, wherein a voltage signal outputted by the skip mode soft control circuit is inputted to a first terminal of the comparison circuit, and the sampling voltage is inputted to a second terminal of the comparison circuit.

8. The system according to claim 1, wherein the feedback signal is inputted to a first terminal of the comparison circuit, and a superposition of a voltage signal outputted by the skip mode soft control circuit and the sampling voltage is inputted to a second terminal of the comparison circuit.

9. The system according to claim 1, wherein a superposition of a voltage signal outputted by the skip mode soft control circuit and the feedback signal is inputted to a first terminal of the comparison circuit, and the sampling voltage is inputted to a second terminal of the comparison circuit.

10. The system according to claim 1, wherein a voltage signal, converted from a current signal outputted by the skip mode soft control circuit, is inputted to a first terminal of the comparison circuit, and the sampling voltage is inputted to a second terminal of the comparison circuit.

11. The system according to claim 1, wherein the feedback signal is inputted to a first terminal of the comparison circuit, and a superposition of a voltage signal converted from a current signal outputted by the skip mode soft control circuit and the sampling voltage is inputted to a second terminal of the comparison circuit.

12. The system according to claim 1, wherein a superposition of a voltage signal converted from a current signal outputted by the skip mode soft control circuit and the feedback signal is inputted to a first terminal of the comparison circuit, and the sampling voltage is inputted to a second terminal of the comparison circuit.

13. The system according to claim 1, wherein the comparison circuit comprises a fourth comparator, a positive input terminal of the fourth comparator serves as a first terminal of the comparison circuit, a negative input terminal of the fourth comparator serves as a second terminal of the comparison circuit, and an output terminal of the fourth comparator serves as an output terminal of the comparison circuit.

14. The system according to claim 1, further comprising:
a first low-frequency signal generator, configured to output a low-frequency signal to be superimposed with a signal outputted by the feedback signal detection circuit.

15. The system according to claim 1, further comprising:
a second low-frequency signal generator, configured to output a low-frequency signal to be superimposed with a signal inputted to the feedback signal detection circuit.

16. The system according to claim 1, further comprising:
a third low-frequency signal generator, configured to output a low-frequency signal to be superimposed with a signal outputted by the primary winding sampling circuit.

17. A PWM controller, comprising the system for controlling a skip mode of a switching power supply according to claim 1.

* * * * *